(12) United States Patent
Van Luchene

(10) Patent No.: US 7,572,187 B2
(45) Date of Patent: Aug. 11, 2009

(54) VIDEO GAME ENVIRONMENT THAT TRACKS HELP AND ADVICE PROVIDED TO OTHER PLAYER CHARACTERS

(75) Inventor: Andrew Stephen Van Luchene, Santa Fe, NM (US)

(73) Assignee: Leviathan Entertainment, Santa Fe, NM (US)

( * ) Notice: Subject to any disclaimer, the term of this patent is extended or adjusted under 35 U.S.C. 154(b) by 433 days.

(21) Appl. No.: 11/421,026

(22) Filed: May 30, 2006

(65) Prior Publication Data

US 2007/0087797 A1 Apr. 19, 2007

Related U.S. Application Data

(60) Provisional application No. 60/727,121, filed on Oct. 14, 2005.

(51) Int. Cl.
*G06F 17/00* (2006.01)
(52) U.S. Cl. ...................................................... 463/42
(58) Field of Classification Search ............. 463/16–25, 463/42
See application file for complete search history.

(56) References Cited

U.S. PATENT DOCUMENTS

| | | | |
|---|---|---|---|
| 6,951,516 B1* | 10/2005 | Eguchi et al. | 463/40 |
| 2005/0272504 A1* | 12/2005 | Eguchi et al. | 463/40 |
| 2006/0128471 A1* | 6/2006 | Willis et al. | 463/42 |
| 2007/0087798 A1* | 4/2007 | McGucken | 463/1 |
| 2007/0087799 A1* | 4/2007 | Van Luchene | 463/1 |
| 2007/0123327 A1* | 5/2007 | Van Luchene | 463/1 |
| 2009/0017886 A1* | 1/2009 | McGucken | 463/1 |

\* cited by examiner

*Primary Examiner*—Ronald Laneau
(74) *Attorney, Agent, or Firm*—Gonzales Patent Services; Ellen Gonzales

(57) ABSTRACT

A virtual game environment in which characters are allowed to give help to one another and in which the game tracks the amount of helpfulness of each character is provided. Characters may be rewarded or paid for giving help to each other. In some embodiments, help may be given in the form of advice.

13 Claims, 2 Drawing Sheets

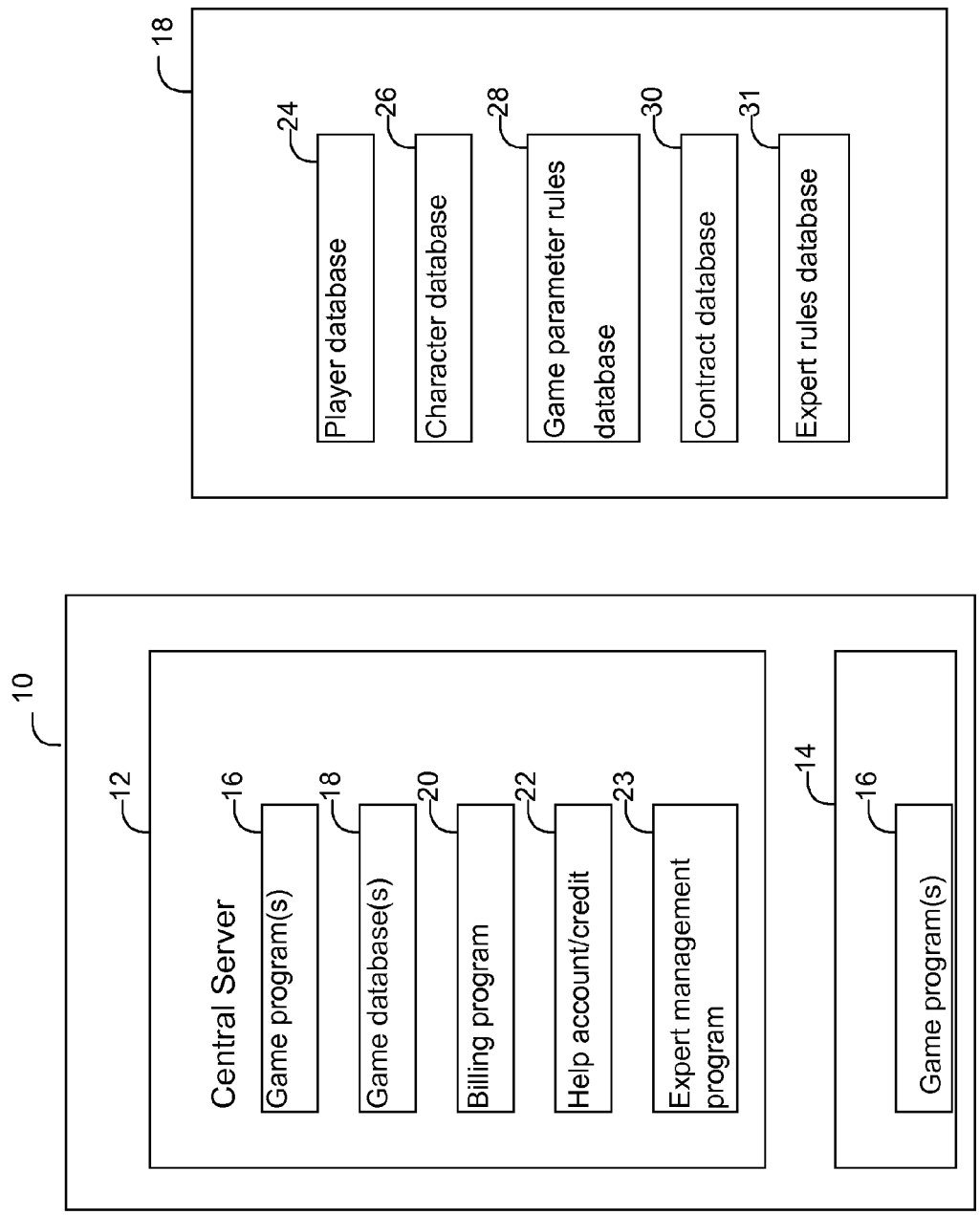

VIDEO GAME ENVIRONMENT THAT TRACKS HELP AND ADVICE PROVIDED TO OTHER PLAYER CHARACTERS

PRIORITY CLAIM

The following application claims priority to U.S. Provisional Application Ser. No. 60/727,121 "Methods, Processes, and System to Enhance a Player Experience of a Video Game" filed Oct. 14, 2005, which is hereby incorporated by reference in their entirety for all purposes.

BACKGROUND

Video games which are accessible to multiple players via a server are well known. For example, hundreds of thousands of players access games known as massive multi player online games (MMOGs). Players of these games customarily access a game repeatedly (for durations typically ranging from a few minutes to several days) over given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community.

It would be advantageous to provide improved methods and apparatus for increasing the enjoyment and/or longevity of video games.

BRIEF DESCRIPTION OF THE DRAWINGS

FIG. 3 is a block diagram of system 10 including an Expert Management program.

FIG. 4 is a block diagram depicting additional exemplary databases suitable for use in a system that includes an Expert Management program.

DETAILED DESCRIPTION

Figure 2:
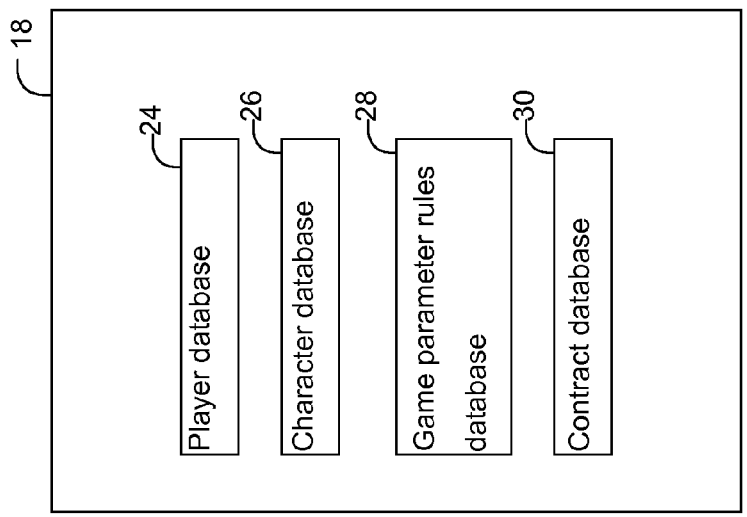
FIG. 2 is a block diagram depicting exemplary databases suitable for use in system 10.

Definitions:

Unless stated to the contrary, for the purposes of the present disclosure, the following terms shall have the following definitions:

Credit Card—a credit instrument issued by a real world institution to a player that allows the player to make purchases by providing an account identifier (e.g. a credit card number) rather than cash or other currency. An example is a credit card like those issued by Visa, Mastercard, or American Express. For the purposes of the present disclosure, the term "Credit card" is intended in a very broad sense and is not limited to those situations in which a player's purchases are made on credit (i.e. where payments for those purchases is not due until a later time) but also includes financial instruments such as debit cards, check cards, and the like.

Real Cash Value—the value in real dollars of the obligation. This value can be determined by multiplying the financial obligation value by the then published exchange rate to real dollars.

Game Environment—an online game such as World of Warcraft or a virtual community such as Second Life.

Total virtual obligation amount—the total amount of virtual financial obligations associated with a player character account.

Virtual Contract—An enforceable agreement between a player character and either another player character or a game server. Some examples of virtual contracts are provided in U.S. Provisional Patent Application Ser. No. 60/652,036, which is hereby incorporated by reference in its entirety for all purposes.

Virtual—shall mean in a game environment or other intangible space.

Virtual Environment—an online game such as World of Warcraft or a virtual community such as Second Life.

Virtual Creditor—shall mean a first player character who is owed a virtual obligation by a second player character.

Virtual Financial Obligation—An agreement by a player character or entity to pay one or more game attributes to another player character, entity or the game server. This obligation can be a one time payment, or multiple payments over time. The obligation can specify that payments are due on virtual or real dates.

Virtual Financial Obligation Value—the in game value of the obligation. For virtual cash the value is stated as a virtual cash amount. For other game attributes, the value can be determined by generating a virtual cash market value for the item based on the current value in an online marketplace or exchange. The value of the obligation can also be set as a condition of the player contract.

Billing Information—shall mean any information pertaining to billing a player including a billing address, credit card account, bank account, pay pal account or other payment information.

Character—shall mean a persona created by a player in a video game.

Character Account—shall mean an account that tracks character attributes.

Character Attribute—shall mean any quality, trait, feature or characteristic a particular Character can have that is stored in the corresponding Character Account. Character Attributes shall include, but not be limited to:

A character score
A virtual object
The physical appearance of a character
An emblem or mark
A synthetic voice
Virtual money
Virtual help points or credits
The ability to join groups of other players at a later time
A score for subsequent matching of later game parameters
A relationship with another character
A genetic profile or makeup Character Life—shall mean a fixed period of virtual or real world time that a player character can exist in a game environment.

Character Skills—shall mean game attributes inherent or acquired by a player character during game play such as, but not limited to: the ability to cast certain spells, foretell the future, read minds, use certain weapons, cook, hunt, find herbs, assemble herbs into potions, mine, assemble objects into other objects, fly, and/or enchant other player characters.

Computer Generated Character—shall mean any character that is generated by the system rather than being another player character.

Game Parameter—shall mean any part of a Video Game by which characters can be measured. Game Parameters shall include, but not be limited to:

Completing all or part of a mission

Playing for a certain period of time

Winning a match against another player character or computer generated character Reaching a certain level or score using or obtaining an ability or technology kill/death ratios obtaining an object solving a puzzle accuracy with weapons effective use of the proper weapon killing a certain character/creature getting through or to a certain geographic area decreasing or increasing points for a character trait (e.g. skill level, strength, intelligence, speed, etc.)

getting, buying, exchanging or learning a new skill or player attribute having a child getting married obtaining, buying, trading, producing or developing raw materials producing goods or services earning income earning a higher rank in an army winning an election among two or more player characters achieving deity status improving player character status or caste assisting other player characters with any of the above speed of accomplishing any of the above In-game Marketplace—shall mean a virtual environment where Characters can exchange Attributes.

Massive Multi Player Online Video Game—Shall mean a Video Game that is played using either a network of a Video Game Central Server and at least two Video Game Consuls or a peer-to-peer network of at least two Video Game Consuls. Players create Characters that may interact with each other in a Video Game Environment that is stored on the Video Game Central Server and the Video Game Consuls.

Novice Player—Shall mean a player that is flagged as requiring the help of an expert to complete a Game Parameter.

NPC—(non player character) a computer generated character in the game

Player—shall mean an individual who can register an account with a Video Game Central Server or within a peer-to-peer network and create Characters that can interact with other Characters in a Video Game Environment.

Player Account—Shall mean an account on the Video Game Central Server or within a peer-to-peer network that contains a Player profile including personal, billing, and character account information.

Player Attribute—shall mean any attribute that can be applied to a player account. Player Attributes shall include, but not be limited to:

Real Money

Discount of monthly fees for playing game

Monthly fee for playing a game

Global character attribute settings for all characters created by player across multiple games.

Rewards for encouraging another player to signup to play

Player to Player Contract—shall mean a virtual but binding contract between player characters that allows the players to provide or exchange game attributes to one another. Once a player-to-player contract is established, the game server or peer-to-peer network automatically distributes acquired game attributes between the player characters based on the contract conditions.

Video Game—shall mean a game played on a Video Game Consul that may or may not be networked to a Video Game Central Server or within a peer-to-peer network.

Video Game Consul—shall mean a device comprising a CPU, memory and optional permanent storage residing at a player location that can allow for the playing of video games. Examples include, home PCs, Microsoft Xbox, and Sony Playstation.

Video Game Central Server—shall mean a CPU, memory and permanent or temporary storage that is connected to multiple Video Game Consuls that allows for Massive Multi Player Online Video Games to be played.

Video Game Environment—Shall mean a virtual video game world that is stored on the combination of the Video Game Central Server and Video Game Consuls where Characters interact and games are played.

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The terms "a", "an" and "the" mean "one or more", unless expressly specified otherwise.

The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus can include, e.g., a processor and those input devices and output devices that are appropriate to perform the method.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as the described herein. In addition, the databases may, in a known manner, be stored locally or remotely from any device(s) which access data in the database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Description

According to one or more embodiments, the present invention provides methods and systems for players to improve their progression through a video game by helping other player characters.

According to one or more embodiments of the invention, "helpfulness," that is the amount of help a given player character has provided to other player characters is a measured trait in a video game. A character's helpfulness may be measured using any suitable method including, but not limited to, those methods that have been previously used to measure other character traits (e.g. strength, health, intelligence, weapon ownership, skills, etc.) with which those of skill in the art will be familiar. For example, a game may include a running tally of help points that are associated with a particular player character. A player character's help point tally may be provided as part of the in-game display, or an item that is accessible (i.e. viewable) by a player before, during, or after game play—for example by accessing and then browsing through a game statistics menu. An in-game help point tally may be provided, for example, as a numerical figure that appears in a portion of the game screen, with or without additional information (e.g. other character trait tallies).

Alternatively, an in-game help point tally may be provided in the form of a bar graph, or through the use of any other suitable indicia.

For ease of description, the present disclosure may make reference to help "points" when referring to a player character's acquisition, accumulation, or loss of helpfulness in a game. It should be understood, however, that a player's helpfulness need not be measured in terms of points or absolute values or given a numerical (or other) measurement. Other systems, such as, for example, where a player character has a certain maximum amount of helpfulness that can be accumulated and the player controlling the character is provided with an indication as to what percentage of the maximum amount of helpfulness has been accumulated (e.g. a simple bar graph that increases and decreases in length as a player character is deemed more or less helpful or gives or receives more or less help) are contemplated by the present disclosure.

According to one or more embodiments, each player character may have an account that measures the amount of help the character has given to other characters. As the game progresses, a character may accumulate help points for helping other characters in the game. For example, character X may be attempting to solve a puzzle in a game that character Y has already solved. Character Y may help character X solve the puzzle and may receive help points for doing so.

According to a first embodiment, the game system may manage, distribute and remove help points from the characters based on their actions without ramification to other players. Accordingly, in the example above, the system may pay character Y a given amount of help points without consequence to character X.

Alternatively, some or all of the help points given to a character who gives help (e.g. character Y) may be paid by (or otherwise deducted from) the character who has received the help (e.g. character X). The help points paid may be deducted from the amount of help points that a character has earned. This embodiment creates a dynamic whereby in order for a character to receive help, the character must give help. Player characters may initially be given a certain number of help points which they can use when they first start the game, or, they may be required to initially help another character before they can receive any help at all.

According to one or more embodiments, help points may be accumulated by assisting another character in completing, partially completing, or attempting to complete a game parameter. It will be understood that the type of assistance given may be dependant upon the particular game parameter that the helpee (the character receiving the help) is attempting to complete.

As non-limiting examples, assistance may be given in the form of written notes (e.g. emails or instant messages including a text-based or other form of an answer or hint); lending or giving a virtual object that solves or helps to solve a puzzle or otherwise aids the helpee in completing the parameter; and/or performing a mission with the helpee.

For example, a particular game may require that a player have collected one or more specific items, such as a key (or set of keys), before a specific door can be opened. A helper may be able to give another character help by: text messaging to the helpee the location of one or more of the keys or other instructions regarding how to obtain the key(s); giving or lending the helpee the key(s); and/or looking for the key(s) with the helpee.

According to one embodiment, a helper may only receive help points if the helpee successfully completes the game parameter. Alternatively, the number of help points given to the helper (the character providing the help) may or may not be dependant upon the degree of success by the helpee in completing the task.

Therefore, according to some embodiments, in the example above, the helper may only be given help points after the helpee successfully opens the door. Alternatively, the helper may be given help points after sending a text message with the location of one of the keys or giving the helpee the key(s), whether or not the helpee actually opens the door.

According to some embodiments, help points are associated with a particular character, not a particular player. As such, a player who controls more than one character may have the characters help each other in order to accumulate help points. Alternatively, such intra-player helping may be disallowed by some game systems.

According to one or more embodiments, the accumulation and/or possession of help points may be a prerequisite for completion of other game parameters. For example, a character may be required to have a certain number of help points in order to advance to the next or a given level in the game, gain or purchase an in-game item or attribute, or perform a certain in-game action.

According to one or more embodiments, the character who is the first to complete a particular game parameter will have right to receive payment (either in help points or in some other form) for helping others to complete the game parameter. According to a further embodiment, a given game parameter may be designed such that only a limited number of characters can complete the parameter without help. Other characters will then have to find a character that has completed the parameter without help and convince that character to give help. As a still further embodiment, the game may be designed so that if one of the characters that originally completed the parameter drops out of the game, a slot is opened up for a new character to complete the parameter without help.

According to one or more embodiments, the amount of help a player can receive before giving help to another character may be limited or may depend upon other actions, such as the amount of help the character has given. In such an embodiment, upon spending a certain number of help points by receiving help, a player may be required to give help to another character before being allowed to complete a game parameter. Alternatively or additionally, upon accumulating a certain number of help points by giving help, a player may be required to receive help before being allowed to complete a game parameter. As a further alternative, a character's success in the game (as measured, for example, by reaching increased levels, accumulation of points or items, amount of time spent in the game, puzzle solving, number of missions completed, etc.) may determine when and to/from whom the character can give or receive help.

For example, in a game in which players solve puzzles and accumulate experience points, a game may be designed such that a character can only receive help for a certain time period or for a certain number of missions before the character must give another character help in order to advance to the next experience point level. Accordingly, such games may be designed to encourage players to decide whether they want to spend their time getting help to get past certain obstacles or giving help to improve their experience point rankings.

As a still further embodiment, a particular player character or an entire player account (and all characters associated therewith) can be flagged as being required to either give or receive help for a given game parameter before a particular character (or character account) is allowed to advance to a next level.

According to one or more embodiments, giving help to a particular character may itself be a game parameter. Specifically, a game may be designed wherein at least one of the game parameters requires that help must be given to a (perhaps specific) other character in order for the game parameter to be completed. It will be understood that in this embodiment the specific other player to whom the help must be given may be controlled by the player who is controlling the helper, controlled by another player, or a non-player character NPC (e.g. a computer-controlled character). The requirement that help be given to the other character may or may not be explicitly stated to the helper.

For example, a particular game may require that a player kill a specific monster in order to advance to a next level. The game may be designed such that the only way for the player to kill the monster is by giving a certain weapon to another character so that the other character can kill the monster. As an added level of complexity, the game may not tell the player that this is how the monster must be killed.

As a further alternative, a character may only receive help points or other rewards for helping when he gives help to a specific character. For example, a player may only receive help points when he gives a player who has been designated as his "buddy" help.

According to one or more embodiments of the invention, a particular game may include a virtual marketplace in which players can find potential helpers or helpees. According to this embodiment, players may be able to post requests and/or offers for help for other players to view.

For example, a game may include a virtual marketplace in which players who are looking for help with completing a particular game parameter can post requests for help. Another player could then view and/or accept one or more requests. Alternatively, the potential helper could send the potential helpee an offer to help, which could then be accepted or rejected by the potential helpee. Once a request has been fulfilled (which, as explained above, may or may not require successful completion of the game parameter by the helpee), the helper may receive help points or other compensation.

According to a further embodiment, once a character has successfully assisted a given number of characters, the character may be given a reward in addition to the help points accumulated. For example, the character may be permitted to advance to a new level in the game. The number of characters that must be assisted by a particular helper may be defined, for example, by the game system. Alternatively or additionally, the game system may require a helper to give help in a given number of game parameters before giving the helper the additional reward.

According to a still further embodiment, characters may need to fulfill certain conditions before they can agree to accept a help request or offer help. For example, only those characters who have completed a particular game parameter may be allowed to give help to a player attempting to complete that game parameter. Alternatively or additionally, only those characters who have accumulated a certain number of experience points, time in the game, depleted their help points to a certain level or who fulfill some other requirement may be allowed to give help.

According to one or more embodiments, the number (or amount) of help points given for help with a certain game parameter may be determined using any suitable means, including, without limitation, a priori by the system, dynamically by the system, or market driven. For example, as mentioned above, a player may submit an offer of help to a player who has posted a request for help to an in-game marketplace. The offer may further include the number of help points the helpee must pay the helper in order to receive the help. Alternatively or additionally, players could post offers to help and potential helpees could contact them with a request for help and the amount of help points the helpee is willing to pay for the help. Players could then end up giving, receiving, accepting and/or rejecting help related bids.

It will be appreciated that help need not be paid for exclusively by help points. For example, players may agree to help each other, "I'll help you with parameter A if you help me with parameter B," trade one or more in-game items or currency for help, or may other arrangements as is suitable for the conditions of a particular game.

According to one or more embodiments, a game may include various skill levels or training that must be earned by playing the game. Characters may be able to sell or trade skills or training to other players. The skill may be offered, for example, as a module available for purchase for a certain amount or to the highest bidder. As a further embodiment, a character who purchases a skill or training may be able to sell the skill or training to another character. According to a still further embodiment, a character who initially purchases a skill (or training) and later sells the skill, may have to pay a fee, such as a percentage of the transaction, to the character from whom the skill was initially purchased.

Figure 1:
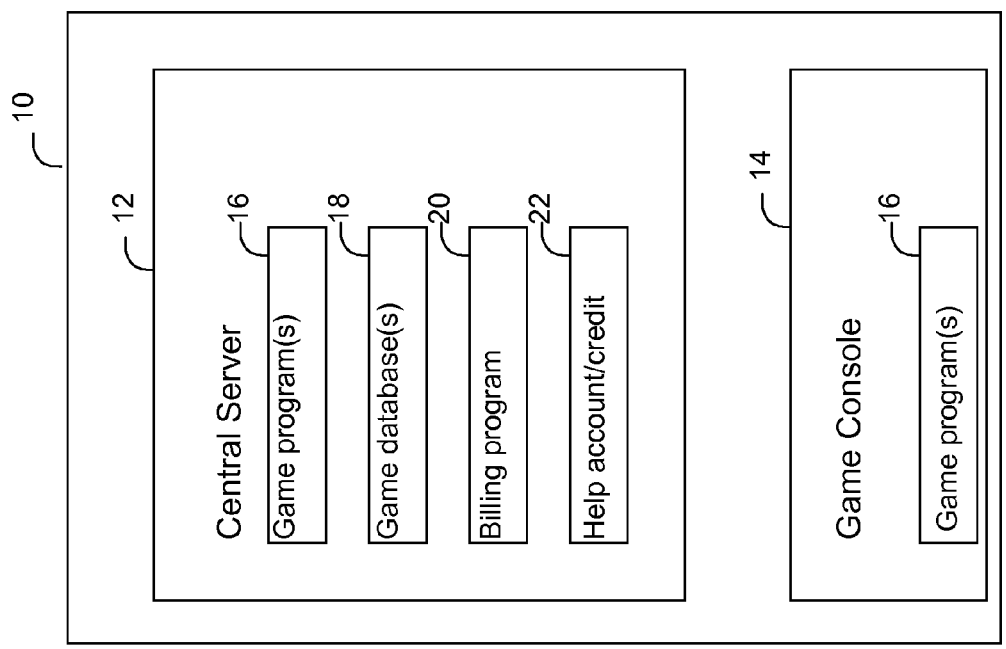
FIG. 1 is a block diagram of a system 10 according to one embodiment of the present description.

FIG. 1 is a block diagram of a system 10, according to one or more embodiments of the present invention. As shown, system 10 includes a central server 12 and a game console 14. Central server 12 includes several modules such as game program(s) 16, game database(s) 18, billing program 20 and help account/credit program 22. As will be appreciated, rather than residing entirely on central server 12, some or all of game program(s) 16 may instead reside on game console 14.

Turning now to FIG. 2, exemplary databases that might be included as some of the game databases 18 residing on central server 12 are shown. As shown, game databases 18 may include a player database 24, a character database 26, a game parameter rules database 28 and a contract database 30.

Player database 24 may comprise data related to the players who access and play the game. As a non-limiting example, player database 24 may link a player's unique identifier (ID) with the player's name, address, and billing information. The player's ID may further be linked to the character(s) that are under the control of the player, this information may be provided in the form of a unique identifier (character ID) associated with each character. Depending on the particular embodiment(s) of the present disclosure that are being used, the player database may further link the player with a list of game parameters and the various help that was given or received in order to complete the game parameter. The database may further link the player with a list of game parameters and an indication of whether help must be given or received by the player in order to complete the game parameter.

Character database 26 may comprise data related to particular player characters in the game. As a non-limiting example, character database 26 may link a character's unique identifier (character ID) with game parameters that require that the character receive help in order to complete the parameter, game parameters that requires that the character give help in order to complete the parameter, and saved game results.

Game parameter rules database 28 may comprise data related to the various game parameters that may be encountered in the game and the help points or credits that may be associated therewith. As a non-limiting example, game parameter rules database 28 may link a game parameter's unique identifier (game parameter ID) with a game parameter title or name, a game parameter descriptor, the amount of help points or credits that may be received for giving help to another character for that game parameter, and the help point cost associated with the game parameter, i.e. the number of help points a character must pay in order to get help with the game parameter. It should be appreciated that a particular game may be designed such that the amount of help points awarded to a player character who gives help on a given parameter may, but need not necessarily, be equivalent to the number of help points that another player character must pay in order to receive help with that parameter.

Furthermore, it should be appreciated that the amount a character must pay in order to receive help need not be equivalent to the amount of pay that is given to the character who is giving help. For example, a helpee may have to give up 100 gold pieces in order to pay a helper 10 gold pieces.

Contact database 30 may comprise data related to various contracts that may be formed between players or player characters in the game. As a non-limiting example, contract database 30 may associate a unique contract identifier (contract ID) with a game parameter ID, the character (or player) ID of the helper, and the character (or player) ID of the helpee.

According to one or more embodiments, system 10 may be configured to qualify a character to give help. For example, system 10 may first retrieve a character account and determine the attributes of the character associated with the retrieved character account. The system may then identify the game parameters for which the character can give help based on the character's attributes and then flag the account as able to give help for the identified game parameters.

As a specific example, a game may be designed such that only characters who have completed a given scored game parameter with a score above a certain threshold can give help on that parameter. Having completed the parameter with a score above the threshold could then be an attribute that is associated with the character. Accordingly, system 10 may be configured to identify those characters that have that attribute (i.e. have completed the game parameter with a score higher than the threshold) and flag those character accounts as able to give help on that parameter.

According to another embodiment, system 10 may be configured to qualify a character to receive help. For example, system 10 may first retrieve a character account and determine the attributes of the character associated with the retrieved character account. The system may then identify the game parameters for which the character can receive help based on the character's attributes and then flag the account as able to receive help for the identified game parameters.

As a specific example, a game may be designed such that only characters who have given help in the last three hours of game time can receive help. Having given help in the last three hours of game time could then be an attribute that is associated with the character. Accordingly, system 10 may be configured to identify those characters that have that attribute (i.e. have given help in the last three hours of game time) and flag those characters as able to receive help. In this example, this limitation may be applicable to all game parameters in the game. Alternatively, as with the example described above with regard to qualification to give help, this, or other, limitation(s) may be applied to only one or some of the game parameters in the game.

According to yet another embodiment, system 10 may be configured to generate a help contract between two (or more) players. For example, system 10 may be configured to receive a request to give or receive help for a game parameter. The system may then output the request to an appropriate character. The system may then receive acceptance of the request and create a new contract between the character requesting to give or receive help and the player accepting the offer to give or receive help.

According to still another embodiment, system 10 may be configured to apply points and/or credits to a character account for giving help. For example, system 10 may be configured to receive an indication that help has been given to a first character from a second character. The system may then determine the help points/credits earned by the second character for giving help to the first character. The number of help points/credits earned may be dependant upon, for example, the type of help given, the difficulty of the game parameter in which the help was given, the success of the first character in completing the game parameter after receiving the help, or other factors. The system may then apply the help points/credits earned to the second character's account.

According to a still further embodiment, system 10 may be configured to deduct help points and/or credits from a character account for receiving help. For example, system 10 may be configured to receive an indication that help has been received by a first character for a given game parameter. The system may then determine the help point/credit cost of receiving help on that game parameter and deduct the help point/credit cost from the first character's account.

According to another embodiment, system 10 may be configured to advance a character to a next level once a given threshold level of help points have been obtained by the character. For example, system 10 may be configured to retrieve a character account, determine if the account has acquired a number of help points above the threshold level, and advance the character to the next level if the required number of help points has been acquired.

According to a further embodiment, system 10 may be configured to provide virtual items or attributes to a character for giving help. For example, system 10 may be configured to receive an indication that help has been given to a first character by a second character. The system may then determine if a virtual item and/or attribute is available for the help that was given. For example, the item and/or attribute may only be available if a certain type of help was given, if the help was given for a certain parameter, or if the help was given to a certain character. If the item and/or attribute is available for the help that was given, the system may then be configured to provide to the item and/or attribute to the second character.

Help may be passed on from one player, for example, an expert player, to another player, for example a novice player. Accordingly, one or more embodiments of the present invention provide methods and system for characters to gain expert status and be rewarded by other characters for providing help in their field of expertise. As stated above, help may take a number of different forms. One form that help may take is as advice. While the discussion below is directed primarily to those situations where the help is provided in the form of advice, it should be understood that any of the methods and systems described below may be modified for those situations where the help is provided in some other form.

Accordingly, one or more embodiments of the present invention provide methods and system for characters to gain expert status and get awarded by other characters for providing advice.

According to an embodiment, characters may be able to qualify to gain expert status for certain game parameters by, for example, having successfully completed the game parameter or having successfully completed other similar game parameters. Once a character has gained expert status for a given parameter, that character may then provide advice to other non-expert players to help them successfully complete the game parameter. For the purposes of ease of description, the character who receives advice will often be referred to as a "novice" character in the present disclosure. While it is often true that a novice character may be a character who is new to the game or who has less experience in the game than the expert, it should be appreciated that the present disclosure does not require this to be the case. Accordingly, unless specifically status to the contrary, the term "novice" should be interpreted broadly to include any character (or player), regardless of experience level, who receives help from another character (or player) and an "expert" shall be interpreted broadly to include any character (or player) regardless of experience level, who gives help to another character (or player).

According to some embodiments, a novice player can offer to contract with an expert player to receive advice about how to satisfy a given game parameter. If the expert accepts the offer, a binding and enforceable contract is created between the two characters. Once the parameter has been completed by the novice, the expert player is given a benefit and the novice player is given a deficit, according to the terms of the contract. Non-limiting examples of benefits and deficits are awards/payments of in-game currency, awards/deficits of point values, awards/deficits of skill levels, awards/deficits of in-game items, awards/deficits of real world currency, and/or combinations thereof.

According to one or more embodiments, a novice player may be required to qualify in order to request or receive advice. Qualification may, for example and without limitation, include: reaching a certain level in the game, acquiring a certain object, paying (e.g. for a subscription to expert services), and/or being a paying member of the game for a certain length of time.

According to one or more embodiments, a novice player who desires to receive advice may be provided with a list of experts who are able to give advice. The novice player may be able to contact, via email, an in-game instant message, a voice over IP service, etc., any one of the experts on the list. If the expert is online, the expert may be notified that a novice would like to receive advice.

According to another embodiment, novices who are seeking advice may be able to post advice requests for example, on a message board. An expert who would like to provide advice may then browse through the advice requests and choose any requests that he would like to answer.

According to another embodiment novices and/or experts may be rated. For example, once an expert works with a novice, the expert may be able to give feedback regarding the novice. This feedback may then be made available to any experts who consider providing advice to the novice. The feedback may be provided to experts in any suitable manner. For example, experts may rank a novice on a 1-10 scale for one or more characteristics such as quickness of learning, did what I asked, performed task successfully, annoying, took up too much time, etc. These rankings, or a composite thereof, may then be provided to the expert. Alternatively, experts may simply write free form or guided reviews and these reviews may be made available. Experts may then select a novice to help with the help of the rating system. Correspondingly, novices may be able to provide feedback on the experts with whom they have worked.

According to another embodiment, experts may be able to provide to the game server a list of criteria which must be fulfilled by a novice before the expert is willing to help the novice. For example, the expert may be able to identify that he will help only novices who have gained a certain feedback ranking, reached a certain level in the game, spent a certain amount of time in the game, or the like. The system may then be configured to notify the expert when an advice request has been received by a novice who fits some or all of the expert's criteria.

According to another embodiment, the system may be configured to select an expert for the novice. For example, in order to qualify as an expert, an expert must agree that he will provide help to any novice that is assigned to him by the system. Alternatively, the expert may be given the power to turn down a novice that has been suggested to him by the system.

The system may select a novice for an expert using any reasonable means. For example, the system may be configured to select a novice by matching a specific request for advice submitted by a novice with a particular expert's field of expertise. Other factors such as whether the expert is online at the time the novice requests the advice may also be considered. Other mechanisms by which expert-novice pairings may be created include: basing the pairing on previous play by the expert (for example, an given expert may be assigned to provide advice each time a certain scenario or event unfolds in the game for which the expert has provided effective advice in the past and/or for which the expert has been highly rated), assigning the pairing at random, or basing the pairing on certain events. Suitable events include, for example, a new character joining the game (e.g. every new player gets an expert coach the first X hours/minutes/days of play), or completing a new game parameter (e.g. each time a character attains a new game level, new character class, or new ability, the character gets an expert coach).

According to one or more embodiments of the present invention, an expert may give advice on a completely voluntary basis. In such a case, a player may simply choose to become an expert when, and only if, he wants. However, a particular game may be designed such that players may need to volunteer to be an expert in order to gain certain advantages in the game, such as, for example, advancement to a new level, attainment of certain items, or attainment of certain skills.

According to one or more embodiments, a player or character may have to qualify to become an expert. For example, a player may be able to become an expert when any of his characters reach a certain experience level. Alternatively, a player may only be allowed to gain expert status when an aggregate of all experience of all characters in that player's account have reached a certain level. Moreover, qualification may be based on factors other than experience, such as ranking in the game, or other player's ratings of the player.

According to an embodiment, a player may be notified when he has qualified to be an expert. The game may offer the player the opportunity to be an expert by, for example, presenting a screen or pop-up window to the player presenting an offer to become an expert. Alternatively, once any qualifications are met, a player may request to be granted expert status. Upon becoming an expert, the player may be provided access to chat rooms, message boards, or other areas of the game that are available to experts.

According to some embodiments, experts may designate one or more areas of expertise—that is one or more game-related areas in which they are willing to coach or provide other help. For example, a particular player may limit his expert advice to only a certain type of puzzle, a certain level of the game, a specific game parameter, etc.

Furthermore, according to some embodiments, experts may designate a specific price or price range for their advice. Alternatively, the cost could be determined by the gaming system. As stated above, the "price" need not necessarily be paid in in-game currency. For example, rather than simply stating that a character seeking advice must pay 10 gold pieces for advice, an expert may designate that he will only give advice to a character who can give him a certain item in return for the advice.

According to some embodiments, the cost of advice could be charged to the novice character upon receiving the advice. For example, experts could post specific pieces of advice on a message board. If a novice reads the posted advice (i.e. opens the message) the novice could automatically be charged the cost associated with the advice. As another example, a novice may enter a chat session with one or more experts. Upon spending a certain predetermined amount of time in the chat session, the novice could be charged a specific cost/fee. Alternatively, the novice could be charged a fee per unit of time of the chat room.

According to one or more embodiments, an arbitration panel could be implemented to oversee and resolve any disputes or conflicts that might arise during the game. For example, a novice who is dissatisfied with the help that he received from an expert could submit a complaint to an arbitration panel. Similarly, an expert who is dissatisfied with the actions of a novice could submit a complaint to the arbitration panel. The panel may be comprised of other experts, other novices and experts, non-players, etc. The panel members may be volunteers, or may be recruited on a voluntary or mandatory basis.

Upon receiving a complaint, the panel may decide whether they vote in favor of the expert who gave the help or the novice who received the help. Whoever the panel decides against may be given some type of penalty. For example, if the panel decides that a particular character's claims have no merit, the novice may be flagged as a "whiner." This label may then be attached to the character for other potential helpers to see. Alternatively or additionally, the character (or player controlling the character) may be barred from submitting complaints to the arbitration panel for a given period of time. Moreover, future panels may be given access to previous arbitration decisions involving the complainant. Alternative or additional penalties may include, without limitation, the character (or player controlling the character) being barred from providing/receiving help for a certain period of time, lowering of the expert's or novice's ranking, full or partial payment refund or reduction, etc.

According to some embodiments, for example those in which a novice is assigned an expert for a certain period of time, payment may be provided on an on-going (e.g. pay as you go) basis. In such a case, should the novice feel that the expert's advice is no longer helpful, the novice may simply stop paying.

According to some embodiments, some or all areas of expertise may requires some threshold competency before a character can be designated as an expert in that area. For example, a character may only be allowed to coach on a particular ability of they character has had that ability for X hours, days, weeks etc, used the ability X times, or achieved a certain number of results (e.g. X number of kills) with the ability. Alternatively or additionally, the threshold competency may be determined by asking the potential expert to take a test or perform some other action. Non-limiting examples of suitable areas of expertise include, reaching a level, using an ability, kill/death ratios, obtaining an object, solving a puzzle, accuracy with weapons, effective use of a weapon, killing a certain character/creature, starting out in the game, successfully navigating through a certain geographic area (e.g. the expert provides or in some way is a map), getting through a certain area using certain skills, game play techniques, or abilities, and/or speed of accomplishing any of the above.

Advice may be provided using any suitable means. For example, the game system may include an in-game communication system such as a chatroom, web interface, text messages, email system, voice communication system, etc. Alternatively or additionally, out of game communication system such as regular email, text messages, phone, and/or mail may be used.

According to another embodiment, experts may be able to observe the game play of novices and notify a novice if he has a suggestion.

Alternatively or additionally, an off-line "replay" system could place the expert in the scenario with which the novice is seeking advice and the novice could watch the expert play that segment. Whether on-line or off-line, one character (e.g. the novice) could shadow the other character (e.g. the expert) during certain parts of the game. The character who is shadowing could be shown on the screen as a "ghost" character. Moreover, the system could allow an expert player to temporarily take over the control of a given novice character. In such a case, the expert's character may be shown as a ghost following the novice character. Alternatively, the novice player may retain control of the novice character while the expert provides advice (for example over an in-game voice system) to the novice. Again, the expert's character could be shown as a ghost following the novice character. As a further alternative, the expert could play the segment while the novice watches. In this case, the novice character could be shown as a ghost following the expert character.

In a further embodiment, novices could submit a segment of game play to an expert pool. Interested experts could each play the segment, essentially competing against each other. The expert with the best performance in the game segment could then be paired with the novice. Alternatively, the novice could be provided with a list of all the experts that completed the segment, along with a price list to see each expert's solution. The novice could then select which expert's advice he would like to receive.

In another embodiment, experts could provide advice on a novice's saved game results. For example, game results could be posted on a message board, and experts could peruse the message board to find a novice they think they could help and/or who they think might pay them for their advice. Alternatively, a contract could be worked out between the expert and the novice and the results viewed by the expert only upon acceptance of the contract.

As stated above, according to some embodiments, novices may be allowed to rate the advice given to them by an expert. Ratings may be provided using any suitable means including, for example, picking a rating from a list (e.g. thumbs up, thumbs down, 1 through 5 stars, a numerical ranking between 1 and 10, etc.) for one or more characteristics and/or an overall ranking or entering a free-form text or voice message. According to some embodiments, the novice may be prompted to give a rating at the end of an advice session and may be required to do so before game play can resume. Alternatively, the novice may be able to defer the rating and go back to it when convenient. As a further alternative, deferred ratings may carry less weight, the longer a novice takes to provide them.

Alternatively or additionally, the game system may automatically rate the advice given by an expert. A system-based rating may be based on whether the player character who received the advice met certain objectives/goals that were the subject of the advice. These objectives/goals may be set by the novice, the expert, or the system. Accordingly, the system may include a mechanism for determining whether the novice who received the advice actually followed the advice given by the expert. If the goals were set by the novice or expert, the system may include a mechanism for identifying the goals in order to determine whether or not they were met by the novice.

For example, if an expert gives a novice advice regarding how to finish a level, the expert's rating may depend upon the how long it took the novice to finish the level, the points and/or skills accumulated by the novice during the level, and/or future success in completing other similar levels. For example, the system may be configured to compare the average skill progress per time of a novice who has received help with the average skill progress per time of other novices.

According to one method of implementing this embodiment, when a character completes a given task (e.g. killing certain monster, finding a certain object), the system checks to see if an expert had given that character advice about that particular quest. If an expert had given advice to that character about that particular quest, the expert could be given a benefit. Accordingly, the system would be configured to record each instance of advice given from the expert to the player and nature of the advice given (i.e how to kill monster X, how to find object Y). The system would be further configured to determine that the novice's actions met the nature of the advice (monster X was killed, object Y was found.) If the advice was limited to a certain identified quest, for example, the system would have to determine whether the character's actions took place during the quest. For example, if monster X or object Y is only available during the identified quest, the system would know that the character was engaging in the identified quest at the time the action was performed.

Moreover, the system could be configured such that if a novice seeks advice from a second expert for advice on the same problem or task, some or all of the benefit that would have gone to the first expert is withheld. This withheld benefit may or may not be passed on to the second expert or refunded in full or in part to the novice.

According to an embodiment, expert ratings can be quantified and compared so that novices can shop for experts. This also provides incentive for experts to give good advice, in order to increase their expert rating and help them increase revenue (in whatever form) from their advice. For example, for each expert, the system may list in a table the average skill progress per time of the novices that the expert coached. The table may then show the expert who coached the characters with the fastest post-coaching progress. Alternatively, for each expert, the system may list in a table the ratio of what each novice gained in the month after coaching versus what the novices paid for the advice. The higher the ratio, the better the "payoff" of the expert's advice. As a further alternative, for each expert, the system may compare the expert's novices' success rates before and after coaching. This would give a measure of how effective the expert's advice was for each novice.

It will be appreciated that all of the methods described above regarding providing ratings of experts may be similarly applied to the rating of novices.

According to another embodiment, awards from successful advice may trickle up an "advice ladder." For example, Character A may give advice to Character B. As Character B's successfully plays through the game, Character A may receive some benefit based on Character B's success. Eventually, Character B may become an expert and give advice to Character C. The game system may be configured such that Character C's success is beneficial not only to Character B, but also to Character A.

Turning now to FIGS. 3 and 4, FIG. 3 provides a block diagram showing system 10 including an expert management program 23. FIG. 4 provides a block diagram showing suitable exemplary databases that might be included in system 10 when system 10 includes an expert management program. As shown, an additional database, expert rules database 31 is included.

In the embodiment depicted in FIG. 4, in addition to the information described above with respect to FIG. 2, player database 24 may further include information regarding the player's expert settings. If expert status is awarded to the player, the status for the player could be identified. Alternatively, if expert status is awarded to the character, the status for each character in the player's account could be identified.

In the embodiment depicted in FIG. 4, in addition to the information described above with respect to FIG. 2, character database 26 could include information related to expert parameters associated with the character.

In the embodiment depicted in FIG. 4, in addition to the information described above with respect to FIG. 2, contract database 30 could include information related to the identification of the expert who is the party to an expert-novice contract.

The expert rules database 31 could include and associate information related to game parameter identification, game parameter name, game parameter descriptor, expert benefit associated with advice given to fulfill the game parameter, and cost to a novice for receiving a advice for that game parameter.

According to one embodiment, system 10 could be configured to allow players to pay extra to have abilities associated with expert status. For example, system 10 may be configured to receive player account set up information and output an offer to identify a player character as a potential expert. If the offer is accepted, system 10 may be configured to receive a billing rule for the potential expert status and apply the billing rule to the expert and novice player accounts.

According to another embodiment, system 10 could be configured to assign a player or player character to be an expert for a particular game parameter. For example, system 10 may be configured to receive an indication that a player character has completed a game parameter; determine if expert status if available for that parameter, output an offer to be an expert to the player character who has completed that game parameter, and, if the offer is accepted, flag the player character as an expert for that game parameter.

According to still another embodiment, system 10 could be configured to pay an expert character for advice given to a novice character. For example, system 10 may be configured to determine if an expert advice contract has been fulfilled. If an expert advice contract has been fulfilled, system 10 may be configured to retrieve payment criteria for the expert advice that was given and apply the payment criteria to the expert and novice player accounts.

Additional exemplary embodiments are described in the following paragraphs.

A method comprising:
providing a virtual video game environment wherein a plurality of characters interact with one another; and
determining the helpfulness of at least one of the characters.

The method described in paragraph 158 further comprising providing indicia configured to indicate a measurement of the character's helpfulness.

The method described in paragraph 159 wherein determining the helpfulness of a character comprises determining if the character has provided help to another character.

The method described in paragraph 160 wherein if the character has provided help to another character, the character's helpfulness increases.

The method described in paragraph 158 wherein determining the helpfulness of a character comprises determining if the character has received help from another character.

The method described in paragraph 162 wherein if the character has received help from another character, the character's helpfulness decreases.

The method described in paragraph 162 wherein, if the character has received help from another character, the method further comprises determining if the character has successfully completed a game parameter after receiving the help.

The method described in paragraph 159 further comprising, providing a reward to a character whose helpfulness measurement is above a threshold.

The method described in paragraph 165 wherein the virtual video game environment includes a plurality of levels and the reward is access to a new level.

The method described in paragraph 158 further comprising a virtual market place in which players can post help-related requests.

The method described in paragraph 168 wherein the help-related requests comprise requests for help.

The method described in paragraph 168 wherein the help-related requests comprise offers to give help.

The method described in paragraph 160 wherein the help is provided in the form of information.

The method described in paragraph 170 wherein the information is provided in the form of a text-message.

The method described in paragraph 170 wherein the information is provided in the form of an oral message.

The method described in paragraph 160 wherein help is provided in the form of an in-game item.

The method described in paragraph 160 wherein help is provided in the form of an in-game action.

The method described in paragraph 158 wherein the virtual video game environment includes a plurality of game parameters that are completed by the characters as the characters progress through the game.

The method described in paragraph 175 wherein at least one of the game parameters can be completed only by receiving help from another character.

The method described in paragraph 175 wherein for at least one of the game parameters, only a limited number of characters can complete the game parameter without help.

The method described in paragraph 177 wherein a character who has completed the game parameter without help can offer to help another character for a cost.

The method described in paragraph 178 wherein the cost is in-game currency.

The method described in paragraph 178 wherein the cost is help points.

The method described in paragraph 178 wherein the cost is a promise to provide future help.

The method described in paragraph 181 wherein the promise is a binding agreement.

The method described in paragraph 175 wherein a character who gives help in a given number of game parameters is given a reward.

The method described in paragraph 183 wherein the reward is access to a new level of the game.

The method described in paragraph 183 wherein the reward is in-game currency.

The method described in paragraph 183 where the reward is an in-game item.

A system comprising:
 a virtual game environment comprising a plurality of game parameters;
 a plurality of characters configured to interact with the virtual game environment; and
 a database configured to track the helpfulness of the characters as they interact with the virtual game environment.

The system described in paragraph 187 further comprising a database configured to determine when a first character has given help to a second character.

The system described in paragraph 188 further comprising a database configured to reward characters as they provide help to other characters.

The system described in paragraph 188 further comprising a database configured to determine when a first character has received help from a second character.

The system described in paragraph 187 further comprising a database configured to identify the means by which a character can successfully complete a game parameter.

The system described in paragraph 190 wherein the means by which a character can successfully complete a game parameter comprises giving help to another character.

The system described in paragraph 190 wherein the means by which a character can successfully complete a game parameter comprises receiving help from another character.

The system described in paragraph 187 further comprising a database configured to identify the game parameters that a character has successfully completed as the character has interacted with the virtual game environment.

The system described in paragraph 193 further comprising a database configured to identify those game parameters for which a character is allowed to give help.

The system described in paragraph 195 wherein the identity of the game parameters for which a character is allowed to give help is based, at least in part, on the game parameters which the character has successfully completed.

The system described in paragraph 196 wherein the character can only give help for a given game parameter if the character has successfully completed the game parameter.

The system described in paragraph 196 wherein the character can only give help for a given game parameter if the character successfully completed the game parameter without receiving help from another character.

The system described in paragraph 187 further comprising a virtual marketplace configured to receive and provide access to help-related requests from the characters.

The system described in paragraph 199 wherein the help-related requests comprise offers to provide help.

The system described in paragraph 199 wherein the help-related requests comprise requests to receive help.

The system described in paragraph 199 wherein the help-related requests include a help point value associated with the request.

The system described in paragraph 187 further comprising a mechanism for determining values for acts of helpfulness that occur in the game environment.

The system described in paragraph 203 wherein the values are dependant upon whether a character who has received help successfully completes the game parameter for which the help was intended.

The system described in paragraph 203 wherein the value is independent of whether a character who has received help successfully completes the game parameter for which the help was intended.

The system o described in paragraph 187 further comprising helpfulness indicia that is viewable by a player controlling a character inside the virtual game environment.

The system described in paragraph 206 wherein the helpfulness indicia is part of an in-game user interface.

A method comprising:
 accessing, via a first character, a virtual video game environment having a plurality of game parameters and a measurement of helpfulness for each character;
 providing help to another character; and
 receiving an increase in the helpfulness measurement associated with the first character.

The method described in paragraph 208 further comprising receiving a reward when the helpfulness measurement associated with the first character reaches a threshold.

The method described in paragraph 209 wherein the reward is access to a new level in the virtual video game environment.

A method comprising:
 providing a virtual video game environment wherein a plurality of characters interact with the virtual environment;
 determining whether a first character is qualified to gain expert status;
 bestowing expert status upon at least one character in the video game environment, thereby creating an expert character;
 determining if the expert has given help to a second character; and
 providing a benefit to the expert if the expert has given help to the second character.

The method described in paragraph 211 wherein the first character is qualified to gain expert status if the first character has made a request to become an expert.

The method described in paragraph 211 wherein the first character is qualified to gain expert status if the first character has successfully completed a given game parameter.

The method described in paragraph 211 further comprising creating an enforceable contract between the expert and the second character wherein the expert agrees to provide help to the second character in return for payment.

The method described in paragraph 214 wherein the payment is in the form of in-game currency.

The method described in paragraph 214 wherein the payment is in the form of an item.

The method described in paragraph 214 wherein the payment is in the form of a promise to perform a future action.

The method described in paragraph 214 wherein at least a portion of the payment is made by the second character.

The method described in paragraph 214 wherein at least a portion of the payment is made by the game system.

The method described in paragraph 211 further comprising providing a message board wherein players can post help requests.

The method described in paragraph 220 wherein the help requests comprise requests for help.

The method described in paragraph 220 wherein the help requests comprise offers to give help.

The method described in paragraph 220 wherein the help requests comprise a fee associated with the giving or receiving of help.

The method described in paragraph 211 further comprising providing a help related rating system.

The method described in paragraph 224 wherein the help related rating system allows a character who have received help to rate the expert who gave the help.

The method described in paragraph 224 wherein the help related rating system allows an expert who has given help to rate the character who received the help.

The method described in paragraph 211 further comprising;
allowing a plurality of experts to compete against one another in a game scenario; and
posting the results of the competition on the message board.

The method described in paragraph 227 wherein the scenario is a scenario that is part of a help request.

The method described in paragraph 227 further comprising allowing the second character to select an expert from whom to receive help based on the results of the competition.

A system comprising:
a virtual game environment;
a message board that is associated with the virtual game environment, the message board comprising a plurality of help requests.

According to another embodiment, the present invention provides a video game environment in which other character players effect attributes of a player character.

In a massive multi player online video game, characters can vote on attributes of each other. Characters can play with each other within a designated game parameter and can be offered the chance to vote on an attribute of a character they have been playing with once that game parameter is complete. If only two characters are playing with each other, then their respective votes can immediately provide attributes to the other player. If more than two players are playing with one another, then the group vote can determine the attributes that each character can get. Attributes can be positive or negative based on the vote of the other characters. Attributes can be tied to particular player characters or to all the characters in a player account.

1. As non-limiting examples, game parameters may include:
2. Completing a mission together
3. Playing for a certain period of time
4. Winning a match
5. Reaching a certain level or score
6. using an ability
7. kill/death ratios
8. obtaining an object
9. solving a puzzle
10. accuracy with weapons
11. effective use of the proper weapon
12. killing a certain character/creature
13. getting through or to a certain geographic area
14. speed of accomplishing any of the above
15. As non-limiting examples, attributes may include:
16. A character score
17. A virtual object
18. The physical appearance of a character
19. An emblem or mark
20. A synthetic voice
21. Virtual money
22. Virtual help points or credits
23. The ability to join groups of other players at a later time
24. Real Money
25. Discounts off monthly fees for playing the game In an alternate embodiment, characters completing a game parameter together can choose an attribute to give to the other characters from a list of available attributes provided by the system.

A visual icon of a multi player score of a player could be visible on the character. For example, a good character gets a trophy or medallion, and a bad character gets an onion. The player's score could actually change the appearance of the character in a game like Everquest. If teammates hate to play with you, your character has a lemon emblem placed on his shield. He could also look like a leper.

The synthetic voice of a character could also be determined based on what other players think of him. For example, an unliked teammate with a bad score could be forced to speak in a Napolean Dynamite voice and a liked teammate could sound like James Earl Jones.

According to one embodiment, if a player has a bad teammate score, then all the new characters they create in a game could be affected by that score.

According to one embodiment, bad teammate scores could be determined the way that is similar to the way in which a hero in the game City of Heroes becomes a villain. I.e. kill enough of your teammates and you turn into a villain.

According to one embodiment, a player with a bad team score could have to pay a penalty tax of experience or virtual money, similar to dying in guild wars. As long as others do not like him, he acquires experience and virtual money at a slower rate.

According to one embodiment, when a player ranks another player, the system could treat all player's rankings equally, or, the system could weight rankings from better players higher than lesser players. A system based upon weighted averages could be used to combine multiple player rankings for any given team member or team.

According to one embodiment, a method to prevent one player from taking revenge upon another player(s) could be utilized. For example, to prevent a player from ranking another player that had recently "killed" him, and/or any ranking of another player that is "out of character" based upon all other rankings, rankings that occur after such an incident might carry a lower weight until or unless validate through other similar unfavorable (or favorable) rankings.

According to one embodiment, the game may provide a method for appealing an unfavorable ranking: In such an embodiment, any player could appeal to have any given ranking removed by either: asking other players to cast a vote to cancel the ranking (such other players must be of equal or greater ranking as the original evaluator. A vote to remove a ranking could require a three to one, or greater, ratio.

According to one embodiment, if players are not liked by other players, they cannot advance in the game.

According to one embodiment, attribute selection can be a range of attributes from very positive to very negative. For instance a group of characters can decide to give each other attributes from a list of five attributes. The first attribute is the best, like a weapon or experience, and the last attribute is the worst, like a bad synthetic voice or a lemon icon on your shield. Each character votes on what attribute to give other characters. An item is selected and applied to a character account by the system based on the votes of other characters in the first character's party.

A system configured to provide the virtual environment described above could include the following structure:
Central Server
1. Game Program
2. Game Databases
3. Billing Program 4. Parameter Completion Program
5. Attribute Distribution Program
Game Consule (PC or Xbox, or Playstation)
1. Game Program
Player Database
1. Player ID
2. Player Name
3. Player Address
4. Player Billing Information
5. Player Character ID(s) 1-N
6. Player Attribute Setting ID(s) 1-N
Character Database
1 Character ID
2. Character Attribute Settings 1-N
Available Attributes Database
1. Attribute ID
2. Attribute Title
3. Attribute Descriptor
4. Required Game Parameter ID
Game Parameter Database
1. Game Parameter ID
2. Game Parameter Title
3. Game Parameter Descriptor The system shown above could be configured to apply an attribute to a character based on selection from other characters after the successful completion of a game parameter. Accordingly, the system could be configured to:
 1. Receive indication that a group of characters have completed a game parameter
 2. Determine if attributes are available for that parameter
 3. Output attributes available to a first character in the party to the other characters in the party
 4. Receive at least one attribute selection
 5. Apply attribute to first character account based on attribute selection(s)

According to yet another embodiment, the present invention provides a voice system using voice recognition in a video game. In an massive multi player online gaming experience, players can select a synthetic voice for their characters in the game. When the player speaks into a headset, his voice is converted into text using voice recognition software. The text can then be converted into messages spoken by the synthetic voice selected by the user. According to some embodiments, the voice can be available only if the character has reached a certain level or acquired a certain attribute in the game. The game can be saved along with the converted text and synthetic voice of players, so that the saved game result can be edited and turned into a product such as a movie or comic book.

According to some embodiments, the voice could be a celebrity voice. Each celebrity could charge a different fee for allowing a player to use her voice. The billing system would keep track of fees for each celebrity and pay them to celebrity accounts based on player usage. Fees for using the speech in the game could be different then fees for using the speech in a saved game result, such as a movie.

According to some embodiments, certain words could be spoken in different celebrity voices by the same character. For instance certain slogans could be spoken in one voice, while the rest of the speech is spoken in another voice. Certain words, spoken by the synthetic voice of certain celebrities could only be available to characters once they have acquired certain attributes in the game.

According to some embodiments, various character attributes that could allow the character to speak in a certain synthetic voices include:

1. Obtaining a certain score in the game
 2. Solving a certain puzzle in the game
 3. Obtaining a certain level in the game
 4. Acquiring a certain virtual item in the game
 5. Obtaining a certain peer score in the game.
 6. Paying an extra fee for the right to have access to certain synthetic voices
 7. Having a player account for a certain period of time
 8. Purchasing a character expansion pack for the game.
 9. Helping other player's in the game obtain certain attributes for their characters An exemplary system configured to provide a virtual environment synthetic and/or celebrity voices might include the following:
Central Server
1. Game Program
2. Voice to Text Program
3. Text to Voice Program
4. Game Databases
5. Saved Game Editor Program
6. Billing Program
Game Consule (PC or Xbox, or Playstation)
1. Game Program
Player Database
1. Player ID
2. Player Name
3. Player Address
4. Player Billing Information
5. Player Character ID(s) 1-N
6. Account Setting(s) for Voice-to-Text option(s)
Character Database
1. Character ID
2. Character Attributes 1-N
3. Character Setting(s) for Voice-to-Text option(s)
4. Saved Game Result(s) 1-N
5. Available Synthetic Voice Database
6. Synthetic Voice ID
7. Synthetic Voice Description
8. Synthetic Voice Alphabet and Sample Words
Saved Game Result Database
1. Saved Game ID Number
2. Saved Game File
3. Saved Game Status (raw, recompiled, edited)

The system described above may be configured to:
 1. Receive voice recording
 2. Convert voice recording into text
 3. Display text in game
 4. Save text in game result Alternatively or additionally, the system described above may be configured to:
 1. Receive text (either typed or spoken text)
 2. Retrieve synthetic voice selection
 3. Convert text into synthetic voice selection
 4. Output text using synthetic voice selection Alternatively or additionally, the system described above may be configured to:
 1. Receive voice recording
 2. Convert voice recording into text
 3. Retrieve synthetic voice selection
 4. Convert text into synthetic voice selection
 5. Output text using synthetic voice selection Alternatively or additionally, the system described above may be configured to:
 1. Receive voice recording
 2. Convert voice recording into text
 3. Save text with saved game result
 4. Retrieve saved game result in game editor 5. Receive edited text from game editor
6. Output saved game with edited text (in poster or comic book format)

Alternatively or additionally, the system described above may be configured to:
1. Receive text of dialogue
2. Retrieve synthetic voice selection
3. Convert text into synthetic voice selection
4. Output text using synthetic voice selection
5. Save game result with synthetic voice selection
6. Retrieve saved game result in editor
7. Receive edited synthetic voice from game editor
8. Output saved game result with edited synthetic voice (in movie format)

Alternatively or additionally, the system described above may be configured to:
1. Receive Player Log in
2. Determine character attributes
3. Determine Synthetic Voices Available for those character attributes
4. Output Available Voices
5. Receive Player Synthetic Voice Selection
6. Save Player Synthetic Voice Selection Alternatively or additionally, the system described above may be configured to:
1. Receive indication that Player completed Game Criteria
2. Determine if a Synthetic Voice is available for that Game Criteria
3. If Synthetic Voice is available, flag player account with access to Synthetic Voice.

Alternatively or additionally, the system described above may be configured to:
1. Receive player log in
2. Determine if synthetic voice is available for that player
3. Output offer to use synthetic voice
4. If offer is accepted store offer acceptance in player account
5. Activate Synthetic voice for that player account.

Alternatively or additionally, the system described above may be configured to:
1. Determine if Player account used (or signed up for) synthetic voice
2. Retrieve fee for using synthetic voice
3. Retrieve player account information
4. Apply fee to player account Alternatively or additionally, the system described above may be configured to:
1. Determine if player used editor to alter Voice to Text saved game results
2. Retrieve fees for using editor
3. Retrieve player account information
4. Apply fee to player account Alternatively or additionally, the system described above may be configured to:
1. Determine if player used Text to Voice in Editor
2. Retrieve fees for using editor
3. Retrieve player account information
4. Apply fee to player account

CONCLUSION

Of course it will be appreciated that the systems methods described herein are provided for the purposes of example only and that none of the above systems methods should be interpreted as necessarily requiring any of the disclosed components or steps nor should they be interpreted as necessarily excluding any additional components or steps.

The invention is described with reference to several embodiments. However, the invention is not limited to the embodiments disclosed, and those of ordinary skill in the art will recognize that the invention is readily applicable to many other diverse embodiments and applications. Accordingly, the subject matter of the present disclosure includes all novel and nonobvious combinations and subcombinations of the various systems, methods and configurations, and other features, functions, and/or properties disclosed herein.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each claim in a set of claims has a different scope. Therefore, for example, where a limitation is explicitly recited in a dependent claim, but not explicitly recited in any claim from which the dependent claim depends (directly or indirectly), that limitation is not to be read into any claim from which the dependent claim depends.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more devices which would, in those other embodiments, have such functionality/features.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. § 1.72(b).

The title of this patent application and headings of sections provided in this patent application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

Unless expressly specified otherwise, an enumerated list of items (which may or may not be numbered) does not imply that any or all of the items are mutually exclusive. Therefore it is possible, but not necessarily true, that something can be considered to be, or fit the definition of, two or more of the items in an enumerated list. Also, an item in the enumerated list can be a subset (a specific type of) of another item in the enumerated list. For example, the enumerated list "a computer, a laptop, a PDA" does not imply that any or all of the three items of that list are mutually exclusive—e.g., an item can be both a laptop and a computer, and a "laptop" can be a subset of (a specific type of) a "computer".

Likewise, unless expressly specified otherwise, an enumerated list of items (which may or may not be numbered) does not imply that any or all of the items are collectively exhaustive or otherwise comprehensive of any category. For example, the enumerated list "a computer, a laptop, a PDA" does not imply that any or all of the three items of that list are comprehensive of any category.

Further, an enumerated listing of items does not imply that the items are ordered in any manner according to the order in which they are enumerated.

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

What is claimed is:

1. A method performed by a computer, comprising:
   communicating across a network to a plurality of video game consoles,
      in which each video game console comprises a CPU and a memory, and
      in which each video game console is programmed to permit a video game to be played by a player who controls a respective player character in the video game;
   providing to each video game console a virtual video game environment in which the plurality of player characters interact with one another;
   determining that the first player character has provided, to the second player character, help in attempting to complete a game parameter;
   increasing an amount of help points of the first player character;
   decreasing an amount of help points of the second player character; and
   displaying, to the first player, a numerical figure that indicates the help points of the first player character.

2. The method of claim 1 further comprising
   determining if the second player character has successfully completed a game parameter after receiving the help from the first player character.

3. The method of claim 1 further comprising
   providing a reward to the first player character upon determining that the amount of help points of the first player character is above a threshold.

4. The method of claim 3 wherein the virtual video game environment includes a plurality of levels and the reward is access to a new level.

5. The method of claim 1 further comprising a virtual market place in which players can post help-related requests.

6. The method of claim 5 wherein the help-related requests comprise requests for help.

7. The method of claim 5 wherein the help-related requests comprise offers to give help.

8. An apparatus comprising:
   a computer that is operable to communicate across a network to a plurality of video game consoles,
      in which each video game console comprises a CPU and a memory, and
      in which each video game console is programmed to permit a video game to be played by a player who controls a respective player character in the video game;
      in which the computer is programmed to:
         provide, to each video game console, a virtual game environment which comprises a plurality of game parameters, and which permits the plurality of player characters to interact with one another;
         determine that the first player character has provided, to the second player character, help in attempting to complete a game parameter;
         increase an amount of help points of the first player character;
         decrease an amount of help points of the second player character; and
         display, to the first player, a numerical figure that indicates the help points of the first player character; and
   a storage device, in communication with the computer, that stores a database configured to record the helpfulness of the player characters as they interact with the virtual game environment.

9. The apparatus of claim 8 in which the computer is further programmed to determine when the first player character has given help to the second player character.

10. The apparatus of claim 8 in which the computer is further programmed to identify the means by which the first player character can successfully complete a game parameter.

11. The apparatus of claim 10 wherein the means by which the first player character can successfully complete the game parameter comprises giving help to the second player character.

12. The apparatus of claim 10 wherein the means by which the first player character can successfully complete the game parameter comprises receiving help from the second player character.

13. The apparatus of claim 8 in which the computer is further programmed to identify the game parameters that the second player character has successfully completed as the second player character has interacted with the virtual game environment.

* * * * *